May 30, 1961  K. C. BUGG  2,986,350
COIL WINDING MACHINE
Filed May 2, 1956  3 Sheets-Sheet 1
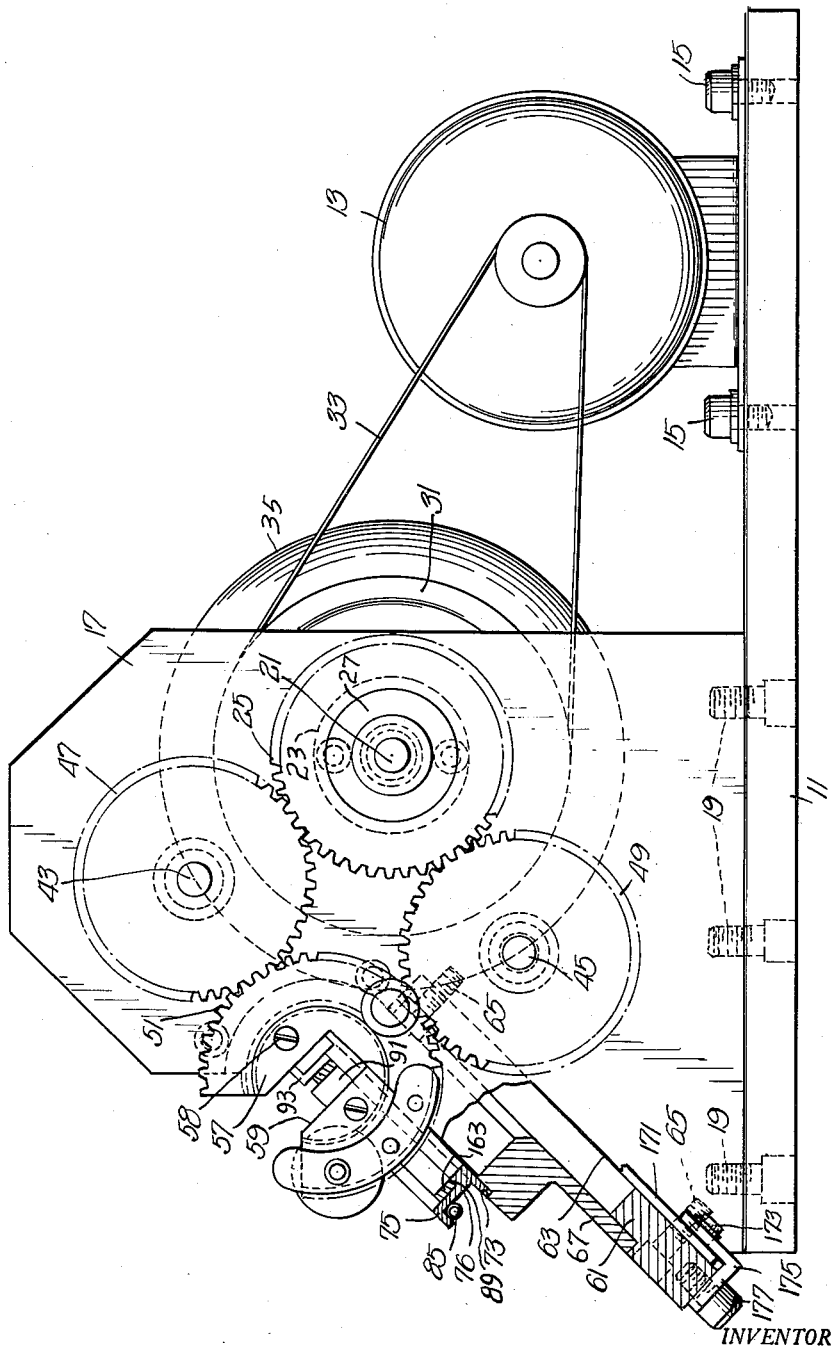
INVENTOR.
Kenly C. Bugg,
BY

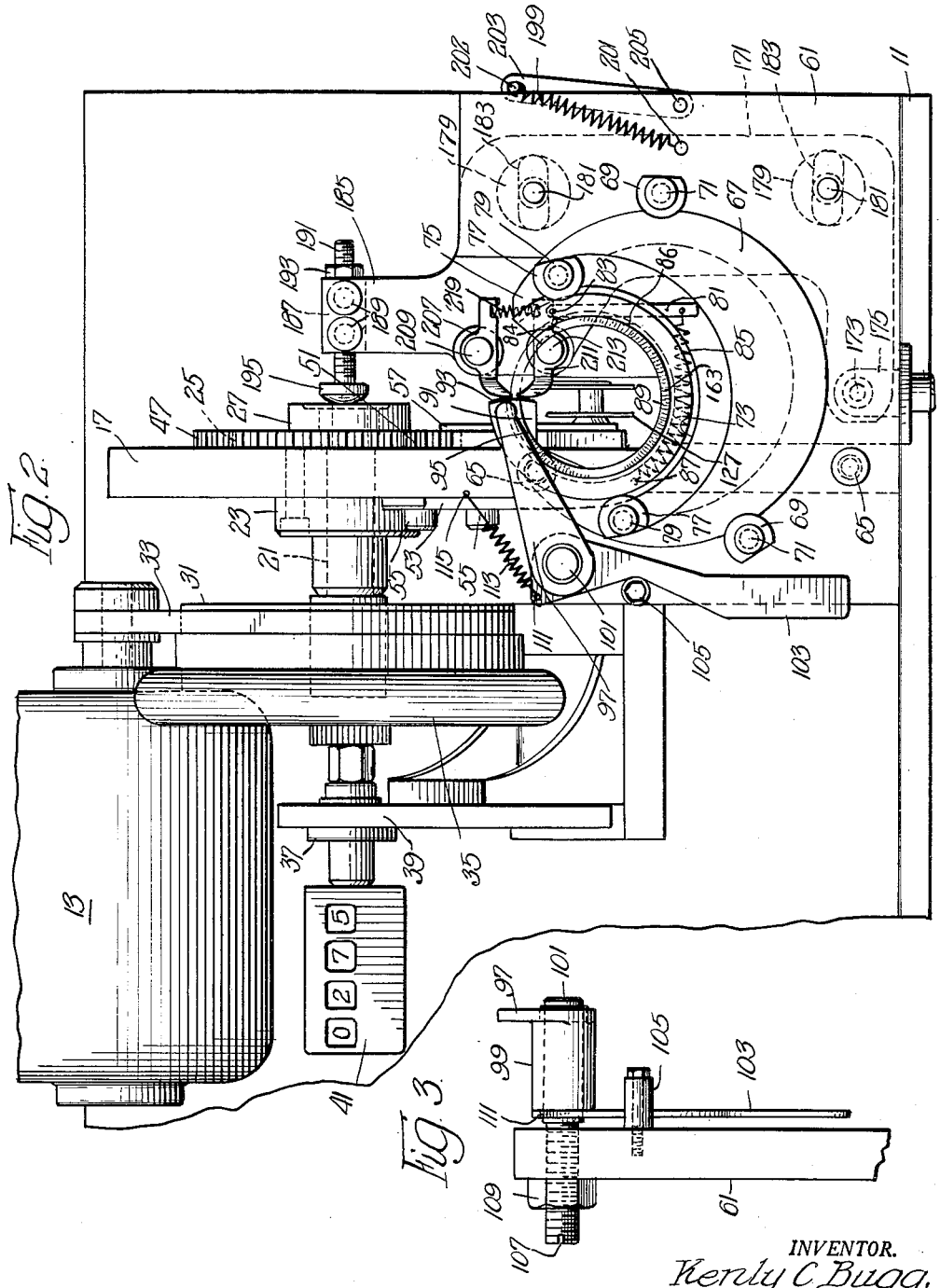

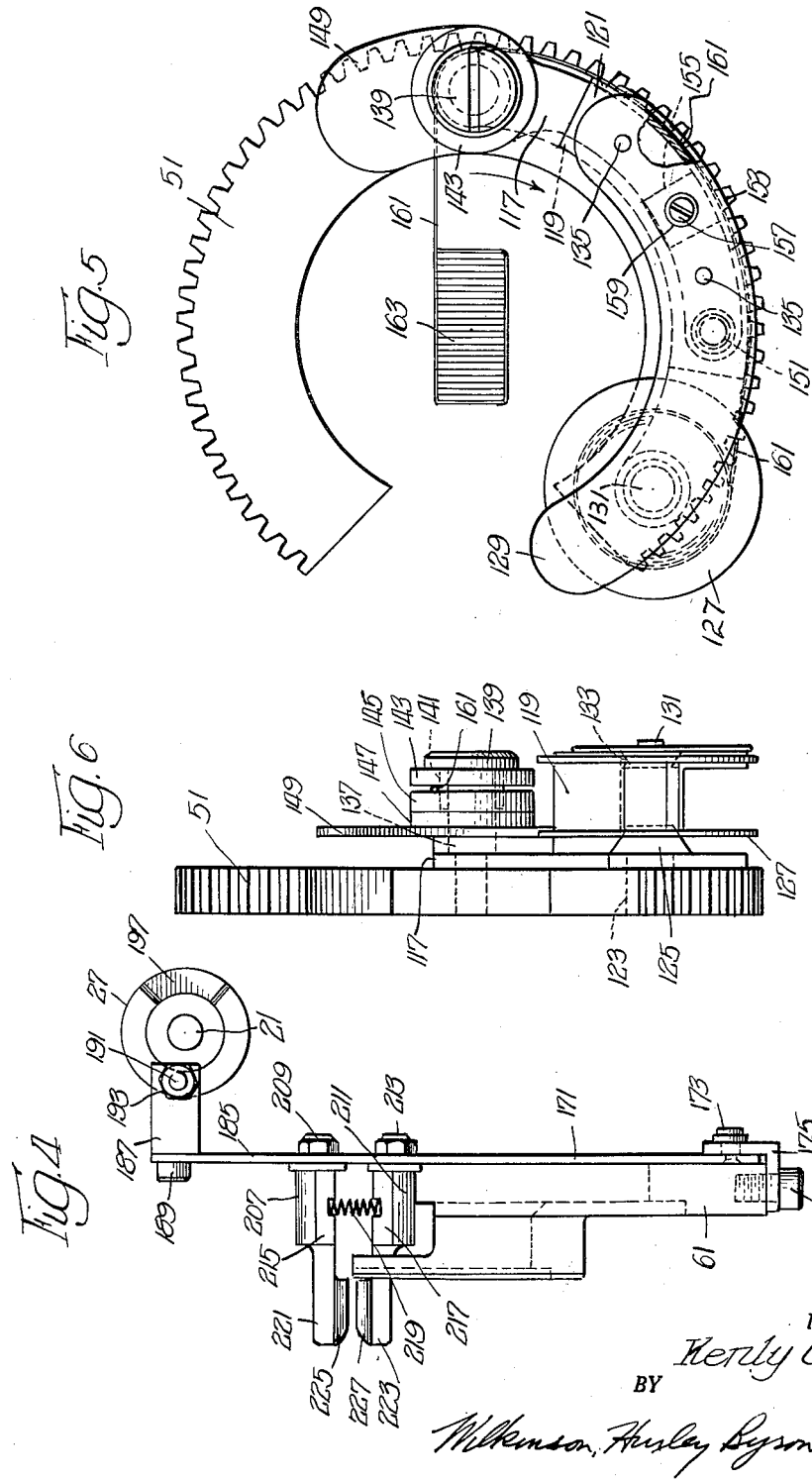

United States Patent Office 2,986,350
Patented May 30, 1961

2,986,350

COIL WINDING MACHINE

Kenly C. Bugg, Fort Wayne, Ind., assignor to Kendick Manufacturing Company, Inc., Fort Wayne, Ind., a corporation of Indiana Filed May 2, 1956, Ser. No. 582,268

10 Claims. (Cl. 242—4)

This invention relates to a new and improved coil winding machine and more particularly to a machine for accurately winding coils on toroidal cores.

The present invention is in the nature of an improvement upon the invention disclosed in my copending application Serial No. 296,784, filed July 2, 1952, for Coil Winding Machine, issued August 7, 1956, as patent 2,757,873.

In electronic apparatus there are numerous requirements for coils wound on toroidal cores, the cores being of various shapes and being of varying materials to provide selected permeability paths for the control and distribution of magnetic flux. In many such requirements it is important that a multiplicity of coils be provided having identical or substantially identical electrical characteristics. It is also often essential that the individual coils maintain great uniformity or an accurately controlled variation in flux density throughout the circumference of the toroid. To accomplish these results it is essential that apparatus be provided for winding the coils with each turn accurately placed and located with relation to the core and to adjacent turns. It is important in many applications of such coils that various characteristics of the coil be closely controlled, such, for example, as inductance, resistance, impedance and distributed capacity. To meet any and all of these requirements it is necessary that the number of turns and their location on the core be accurately maintained in individual windings and also that multiple windings, whether superposed or adjacently placed on the core, be accurately located and related to other windings. To be of commercial utility it is also important that such apparatus be capable of applying the turns rapidly, as many such coils involve large numbers of turns of very fine wire.

It is an object of the present invention to provide a new and improved coil winding machine for winding coils on toroidal cores.

It is a further object to provide such a machine including means for imparting controlled and adjustable tension to the wire being wound.

It is another object to provide a machine in which the core is rotated in a step by step manner, said movement being uniform and accomplished at a predetermined point in the winding of each turn of the coil.

It is also an object to provide a machine in which the core is rotated during winding by means engaging the last wound turn of the coil, and in which the amount of said movement may be accurately controlled and made with great uniformity.

It is a further object to provide a machine capable of winding wires of different sizes by substitution of bobbins containing the desired wire and without mechanical adjustment of the machine.

It is an additional object to provide a machine capable of winding coils on cores of a substantial range of sizes and shapes by substitution of core holding elements designed for the various cores.

It is a further object to provide a machine which is compact and comparatively simple in design and rapid in operation.

It is also an object to provide a machine upon which coils may be accurately wound by comparatively unskilled labor after a minimum of instruction.

It is an additional object to provide a machine into which the cores may be quickly placed and wound coils quickly removed and from which partly wound coils may be readily removed for testing and then accurately replaced for additional winding.

It is a further object to provide a machine adapted for commercial production and use.

Other and further objects will appear as the description proceeds.

I have shown certain preferred embodiments of my invention in the accompanying drawings in which—

Figure 1 is a side elevation of the apparatus with certain parts removed;

Figure 2 is a view of the apparatus of Figure 1 looking downwardly from the upper left at an angle of approximately 45 degrees;

Figure 3 is a fragmentary side view of the hold-down mechanism;

Figure 4 is a fragmentary side elevation showing the kicker mechanism;

Figure 5 is a face view of the interrupted ring gear carrying the bobbin and tensioning mechanism; and Figure 6 is an elevation of the mechanism of Figure 5 as seen from the left.

Referring to Figures 1 and 2, the apparatus is mounted on a base 11 which also supports an electric drive motor 13 secured to the base by machine screws 15. The vertical bearing supporting plate 17 is secured to the base plate 11 by means of the machine screws 19. The main drive shaft 21 passes through bearing 23 mounted on the bearing plate 17. This shaft 21 carries the driven gear 25 on the right side of bearing member 17, as seen in Figure 2. The cam disc 27 is also carried by shaft 21 and is located against and secured to the outer face of the gear 25.

The left end of shaft 21 carries a pulley 31 to receive the drive belt 33 which is driven by motor 13. To the left of pulley 31, as seen in Figure 2, shaft 21 carries a hand wheel 35 by means of which the shaft may be manually rotated. The left end of shaft 21 extends through bearing 37 mounted on bearing bracket 39 and drives a counter 41 which indicates the number of rotations made by the shaft.

The bearing plate 17 carries the stub shafts 43 and 45 upon which are mounted the idler gears 47 and 49, respectively. These gears 47 and 49 are the same in size and pitch and both mesh with the interrupted bobbin gear 51. Different sizes of drive, idler and bobbin gears may be substituted where bobbin gears of other sizes are required for cores of different sizes. It is only essential that the two idler gears be of the same size. The bobbin gear 51 is mounted to rotate freely on a nose member 53 which has a base portion located on the left side of plate 17, as seen in Figure 2, and is secured thereto by machine screws 55. The nose member extends through the member 17 and through the bobbin gear 51 and has a shoulder forming a bearing for the gear. The gear 51 is held in place on the nose member 53 by the nose plate 57 secured in place by screws 58 as shown in Figure 1. This nose plate 57 overlaps the inner circumference of the bobbin gear 51 sufficiently to hold it on the nose piece 53. As best shown in Figure 1, both the nose piece 53 and nose plate 57 have a rectangular recess or cut away portion 59 through which the core to be wound passes in the operation of the apparatus. The nose piece 53 does not appear in Figure 1 as it is behind the nose plate 57 and gear 51. Figure 1 shows the cut away portion of bobbin gear 51 opposite the recess 59 at which point of rotation of the gear the core may be inserted or removed from the apparatus.

The ring plate 61 is secured to a sloping face 63 formed on the vertical bearing plate 17. This plate 61 is shown as secured to the member 17 by the machine screws 65. This plate 61 has a generally circular recess formed therein to receive the generally circular base of the eccentric ring 67. This ring is removably held in the recess by means of the mutilated washers 69 clamped down against the edge of the eccentric ring by means of machine screws 71. The eccentric ring 67 in turn is provided with a generally circular recess 73 into which is fitted the holding ring assembly 75 which holds the cores during the winding steps. This ring 75 is retained in place by the mutilated washers 77 which are clamped down by adjustment of machine screws 79.

The holding ring 75 has an outer circumferential recess 76 formed therein which receives the lever 81, which lever is pivoted to the ring at 83. An intermediate portion of the lever 81 passes laterally through a slot in the inner wall of recess 76 so as to frictionally engage the side of a core in the ring 75. The ends of the slot have been indicated on Figure 2 at 84 and 86. The lower end of the lever 81 has connected thereto a spring 85 which is fitted in the recess 76 and the other end of which is connected to the ring at 87. This lever 81 serves to hold the core being wound against accidental rotation in the core holding ring member 75 due to its frictional contact therewith. It permits the core, however, to be rotated during the winding by the mechanism to be described hereinafter. The ring 75 has an inner flange 89 upon which the core to be wound rests.

At its upper left portion, as seen in Figure 2, the ring member 75 has an inner circumferentially extending nose piece 91 which, with the left nose portion 93 of the ring, forms a channel 95 through which the core passes at this point which is immediately after the wire has been wound thereon. A phantom core 163 has been shown in place in Figures 1 and 2. It is to be understood that a plurality of interchangeable eccentric rings 67 and core holding members 75 may be provided in order to accurately hold cores of differing sizes and shapes.

The core is held down in the ring 75 and against the seat portion 89 by the hold-down arm 97 which is positively secured to the sleeve 99 mounted on shaft 101. The opposite end of the sleeve 99 has rigidly connected thereto the finger piece 103 which normally engages the stop stud 105 mounted on the plate 61, as shown in detail in Figure 3. The shaft 101 is threaded in the plate 61 and is provided with a slotted end 107 so that it may be adjusted to extend a greater or less distance through plate 61. It is held in adjusted position by the lock nut 109. This adjustment permits the use of the hold-down effectively with cores of different thickness. The finger piece 103 is provided with a shoulder 111 to which is connected a spring 113, the opposite end of the spring being connected at 115 to the vertical bearing plate 17. This spring serves to normally hold the finger piece 103 against the stop 105 with the hold-down member 97 over the channel 95 in the ring member 75.

Referring next to Figures 5 and 6, the interrupted bobbin gear 51 has secured to its outer face a channel member 117 which is arcuate in form and has a lower and longer leg or flange secured to the face of the ring gear. The bottom 119 of the U-shaped channel 117 extends at right angles away from the gear 51 and the outer shorter leg 121 of the channel extends parallel to the gear. This channel 117 has one end secured to the gear by the stud 123 which has a frusto-conical head 125 adapted to fit into one side of a bobbin 127. The bobbin hold-down spring 129 at its free end carries a rivet 131 with a similar frusto-conical head 133 adapted to fit into the opposite side of the bobbin 127. This bobbin hold-down spring 129 is secured to the outer leg 121 of channel 117 by rivets 135.

The opposite end of the lower leg of channel 117 is secured to the ring gear 51 by the stud 137 which has the enlarged head 139. The intermediate portion of stud 137 carries a short steel sleeve 141 on which is fitted a steel washer 143. The Teflon washer 145 is fitted on sleeve 141 adjacent the steel washer 143. The steel spring contact washer 147 is fitted on the stud 137 adjacent the Teflon washer 145. The adjustable tension spring 149 is arcuate in formation so that it overlies the bobbin gear 51 and has its lower end riveted at 151 to the lower or base leg of the channel 117. The spring 149 has an opening formed therein through which the stud 137 passes, the face of the spring pressing against the spring contact washer 147. The spring adjustment bar 153 has an arcuate body extending around the outer edges of the legs of channel 117 and a radially extending leg 155 located against the outer face of the inner leg of the channel 117, underlying an intermediate portion of the tension spring 149. The tension adjusting screw 157 is threaded into the leg 155 and passes through the adjustable spring 149. The inner end of the screw 157 bears against the lower leg of the channel 117. An opening 159 is formed in the bobbin spring 129 so that the adjusting screw 157 may be reached by a screw driver to put greater or less tension on the spring 149.

As shown in Figure 6, the wire 161 to be wound passes between the steel washer 143 and the Teflon washer 145 and bears against the steel sleeve 141. The meeting edges of washers 143 and 145 are rounded so as to facilitate the insertion of the wire. As shown in Figure 5, the wire will pass from bobbin 127 around a channel in the outer face of the spring adjustment bar 153 and from there up between washers 143 and 145. From tension washers 143 and 145 the wire will be led around the core 163, shown in Figure 5, on which the coil is to be wound. As indicated by the arrow in Figure 5, the bobbin gear is rotated in the clockwise direction, as seen from the face carrying the bobbin and tension assemblies.

The kicker plate 171 is pivoted at 173 on the angle bracket 175 which is secured to the bottom edge of plate 61 by means of machine screw 177. As shown in Figure 2, the main portion of this kicker plate 171 is generally C-shaped in contour, passing from its pivot point up laterally off the coil winding mechanism behind the plate 61. It is held against the rear of the plate 61 by the large heads 179 of studs 181 which studs are secured to plate 61 and pass through elongated slots 183 formed in the plate 171. The plate is so held as to be movable about the pivot pin 173. The kicker plate 171 has an upwardly extending arm 185 to which the block 187 is secured by machine screws 189. The cam contact screw 191 is threaded through block 187 and is held in adjusted position by lock nut 193. This screw 191 has an enlarged cam contact head 195 which bears on cam 27.

As best shown in Figure 4, the cam 27 has a cam drop 197 formed therein, this cam drop extending for approximately 90 degrees. The spring 199 is connected at 201 to a pin secured to the underface of the kicker plate 171. The other end of the spring is secured to an upwardly extending operating pin 202 carried by a spring bar 203 which has its opposite end pivoted at 205 to the underface of the plate 61. The pin 202 is held against the side of plate 61 by the tension of spring 199. This spring 199 serves to urge the kicker plate 171 in the counter-clockwise direction about its pivot 173, thus urging the head 195 of the cam screw 191 into contact with the face of the cam disc 27. The spring bar 203 may be manually swung by pin 202 in the clockwise direction until the pin 202 again engages the edge of plate 61 below the pivot 205. The spring 199 then pulls the kickers 207 and 211 away from the noses 91 and 93 to provide clearance for the operator in starting or stopping a winding or pulling off intermediate taps.

The upper kicker 207 is secured to kicker plate 171 by means of screw 209 and the oppositely facing lower kicker 211 is similarly secured in position by screw 213. The kickers are free to rotate on the screws 209 and 213 and their rear portions 215 and 217 are urged apart by the compression spring 219. The kickers 207 and 211 have upstanding portions 221 and 223 at their left ends, which portions carry the wire engaging kicker flanges 225 and 227, respectively. These portions 225 and 227 will engage opposite faces of a toroidal core inserted in a machine and will be held against these faces by the spring 219. Due to the play allowed between the kicker rear portions 215 and 217, the kicker flanges 225 and 227 will receive a substantial range of sizes of cores and will be held against the core faces by spring 219. It is to be understood that kickers with different sizes and shapes of wire engaging kicker flanges may be provided for cores of widely differing shapes and dimensions.

In the use of the apparatus, it will be set up with an eccentric ring 67 and a core holding member 75 adapted for the particular core to be wound. It is to be understood that the channel 95 between the two nose portions 91 and 93 of the core holding member 75 is of sufficient width to take the core with the coil wound thereon. A core is inserted in the core holding member 75 from above, this requiring that the hold-down member 97 be moved out of the way by means of finger piece 103. It is also necessary to separate the kicker flanges 225 and 227 by pressing together the rear ends of the kickers so as to permit the core to pass down between the flanges. As the core moves downwardly toward its seat in the core holding member 75, it will also engage the edge of the friction bar 81 and this bar must be swung to the right or in the counter-clockwise direction, as seen in Figure 2, by pressing its lower end and moving it against the tension of the spring 85.

Once the core is seated, the hold-down member 97 engages its upper edge and the kicker flanges 225 and 227 engage its lateral inner and outer faces. The friction bar 81 also frictionally engages the outer face of the core.

If this is the initial use of the machine in its set up for a particular core it will be necessary to make further fine adjustments. The end of the wire to be wound will be led off of bobbin 127 and between the nose members 91 and 93 and the kicker flanges 225 and 227. It will be given a partial turn around the core and the end secured in place as by a small piece of adhesive tape. A suitable length of wire to provide an end lead for the coil to be wound will normally be drawn off and taped in place, if desired.

The machine may then be manually operated by rotating the hand wheel 35 to put a turn on the core. The cam 27 is so co-ordinated with the winding action of the bobbin gear 51 that the kickers 225 and 227 engage the last wire turn just after the bobbin gear has passed the position in which it is shown in Figure 5. It is to be noted that the movement of the core by the kickers is accomplished by the pressure of the spring 199 and not by positive cam action. The cam lifts the head 195 of the cam screw 191 through the greater part of the rotation of the bobbin gear 25. This keeps the kicker flanges 225 and 227 clear of the wire during this portion of the winding. Then as the bobbin passes the position of Figure 5, the head 195 of the cam screw 191 drops down into the lower portion of the cam. This permits the spring 199 to swing the whole kicker plate 171 in the counter-clockwise direction about its pivot 175. The kicker flanges 225 and 227 engage the opposite runs of the last turn of wire as the kicker flanges move toward the nose pieces 91 and 93. The thrust of spring 199 causes the parts to move until the kicker flanges actually engage the nose portions 91 and 93 of the core holding member 75.

Consequently, the actual rotation of the core is independent of the arc of movement of the kicker plate 171. This movement is controlled by the spacing between the nose pieces 91 and 93 and the outer face of the wire turn or the face toward the kicker flanges 225 and 227. Therefore, if this first turn of wire is wound so that it passes in direct contact with the inner nose piece 91, the movement of the core will be exactly the width of the wire which has been wound measured on the inner face of the core. Since the outer face of the core has a greater diameter and hence greater circumference, its linear movement will be greater and the wires on this face will be spaced apart slightly. If it is desired to space the wires on the inner face of the core, the lower kicker flange 227 may be provided with a pusher lip adapted to pass into the channel 95 the desired spacing distance.

The location of the wire as it passes to the core is controlled by the location of the space between the steel washers 143 and Teflon washer 145, shown in Figure 6. This location is not adjustable. Therefore, in order to have this wire pass on to the core at exactly the desired point and angle, the core holding member 75 is adjusted in its position in the eccentric ring 67 by loosening screws 79 and consequently the hold-down effect of washers 77. When the member 75 is properly adjusted, the washers 77 clamp the member 75 in place by tightening screws 79. A greater range of adjustment may be taken care of by loosening screws 71 which hold washers 69 against the edge of the eccentric ring 67 and rotating that ring after which it is clamped in adjusted position.

The pressure of the spring 149 against the washer 147 which thrusts the Teflon washer 145 toward steel washer 143 serves to control the tension imparted to the wire 161 as it is wound. This pressure of spring 149 is controlled by adjusting the screw 157 shown in Figure 5. It will be understood that the coils are normally wound with very fine copper wire having a plastic coating which may be substantially distorted or stretched without breaking. At times it may be found desirable to supply sufficient tension to the wire so as to elongate it and reduce its diameter. Thus a greater number of turns may be placed on a given arc of a specific core.

It will be noted that the wires are not wound on the core by the present apparatus in a spiral formation. Referring to Figure 5, the wire will be wound on the upper and lower portions of the core 163 in the same plane and extending parallel to the axis of the core. The portion of an individual turn at the left of the core in Figure 5 will extend radially of the core. The two kickers engage the upper and lower portions of the turn simultaneously and move the whole core the width of the wire while the wire is being brought down across the right end of the core cross section, as seen in Figure 5. This last portion of the turn, therefore, will have an angularity relative to a line radial of the core, which angularity is determined by the thickness of the wire. In other words, the wire will be offset or angled in this portion of the turn a distance such that succeeding turn portions on the inner face of the core cross section lie in contact with preceding turn portions. The wires on the outer face of the core will be parallel and spaced from each other an amount determined by the thickness of the core and increased circumference of the outer face relative to the inner face.

During the winding of a coil on a core, it will be understood that the winding may be stopped at any point for drawing off taps or for testing the portion of the coil already wound. The turn counter 41 will show the number of turns made by the rapid motor drive and the motor can be stopped just before the desired stopping point is reached. The hand wheel 35 is then rotated to bring the wire to the exact turn and point in a turn where it is desired to test or to stop or to draw off a tap. While reference has been made to a single wire, it will be understood that the machine can be used for winding a plurality of turns simultaneously, these turns being connected in any desired manner or representing interwound separate windings. The machine may also be used for winding multilayer coils, suitable core holding members being provided to take care of the increase in size due to previous windings. The machine may be made in various sizes to handle different types of cores and sizes of wire. On any given machine there is a substantial latitude afforded by changing to different eccentric rings and core holding members. Also, kickers of different forms and shapes may be provided for different types of core.

While I have shown and described a specific form of construction this is to be understood to be illustrative only as it is capable of variations to meet differing conditions and requirements and I contemplate such modifications as come within the spirit and scope of the appended claims.

I claim:

1. Coil winding apparatus for winding coils on toroidal cores, said apparatus comprising means for supporting a toroidal core, an interrupted bobbin gear and a bobbin carried by said gear, the core supporting means supporting a core with a portion thereof within the gear, the interruption in the gear permitting insertion of the core in the core supporting means, means for rotating the bobbin gear to wind wire from the bobbin onto the core, a movable kicker member for engaging a turn of wire on the core to move the core, a fixed nose on the core holding member adapted to be engaged by the kicker member, means for moving the kicker member away from the nose, and yieldable means for urging the kicker member toward the nose.

2. Coil winding apparatus for winding coils on toroidal cores, said apparatus comprising means for supporting a toroidal core, an interrupted bobbin gear and a bobbin carried by said gear, the core supporting means supporting a core with a portion thereof within the gear, the interruption in the gear permitting insertion of the core in the core supporting means, means for rotating the bobbin gear to wind wire from the bobbin onto the core, a movable kicker member for engaging a turn of wire on the core to move the core, a fixed nose on the core holding member adapted to be engaged by the kicker member, a cam operated in synchronism with the bobbin gear, a cam contact member engaging the cam, said contact member being connected to the kicker member, yieldable means urging the contact member toward the cam, the cam holding the kicker member away from the nose piece during a portion of the cam cycle, and permitting the kicker member to be moved by the yielding means to engage the nose piece during another portion of the cycle.

3. Coil winding apparatus for winding coils on toroidal cores, said apparatus comprising an interrupted bobbin gear, a bobbin carried by said gear, means for rotating the bobbin gear, and means for supporting a toroidal core with a portion of the core passing through the gear, said means comprising an arcuate core holding member, said core holding member having an arcuate recess formed therein to hold the core, an arcuate flange extending into the recess to serve as a seat for the core, the arcuate recess extending through an arc of greater than one hundred and eighty degrees, a mounting means for said member, the mounting means having an arcuate recess therein closely fitting the core holding member, a fixed support for the mounting means, means for securing the mounting means in a selected position on the fixed support, the member being movable circumferentially in said mounting means, and means for holding the member in a selected position in the mounting means.

4. Coil winding apparatus for winding coils on toroidal cores, said apparatus comprising an interrupted bobbin gear, a bobbin carried by said gear, means for rotating the bobbin gear, and means for supporting a toroidal core with a portion of the core passing through the gear, said means comprising an arcuate core holding member, said core holding member having an arcuate recess formed therein to hold the core, an arcuate flange extending into the recess to serve as a seat for the core, the arcuate recess extending through an arc of greater than one hundred and eighty degrees, a mounting means for said member, the mounting means having an arcuate recess therein closely fitting the core holding member, a fixed support for the mounting means, means for securing the mounting means in a selected position on the fixed support, the member being movable circumferentially in said mounting means, and means for holding the member in a selected position in the mounting means, the member having a nose thereon serving to guide wire from the bobbin onto a core.

5. Coil winding apparatus for winding coils on toroidal cores, said apparatus comprising an interrupted bobbin gear, a bobbin carried by said gear, means for rotating the bobbin gear, and means for supporting a toroidal core with a portion of the core passing through the gear, said means comprising an arcuate core holding member, an eccentric ring for mounting the core holding member and a fixed support for the eccentric ring, the eccentric ring being circumferentially movable in the fixed support and the core holding member being circumferentially movable in the eccentric ring, the eccentric ring and core holding member each having means associated therewith for holding it in a selected position.

6. Coil winding apparatus for winding coils on toroidal cores, said apparatus comprising an interrupted bobbin gear, a bobbin carried by said gear, means for rotating the bobbin gear, and means for supporting a toroidal core with a portion of the core passing through the gear, said last-named means including a core holding member having an arcuate recess therein to hold the core, a movable member for holding a core down in said recess, the core holding member having a slot formed therein extending into the arcuate recess, a member extending in said slot and resilient means urging the last mentioned member through said slot to frictionally engage a core and to resist rotation thereof.

7. Coil winding apparatus for winding coils on cores, said apparatus comprising core holding means having a nose thereon, means for winding wire on a core adjacent said nose, a movable kicker member serving to engage a turn of wire on the core to move the core, means for moving the kicker member away from the nose, and means for moving the kicker member against the nose.

8. Coil winding apparatus for winding coils on cores, said apparatus comprising core holding means having a nose thereon, means for winding wire on a core adjacent said nose, a movable kicker member serving to engage a turn of wire on the core to move the core, means for intermittently moving the kicker member away from the nose and resilient means urging the kicker member toward the nose.

9. Coil winding apparatus for winding coils on cores, said apparatus comprising core holding means having a nose thereon, means for winding wire on a core adjacent said nose, a movable kicker member serving to engage a turn of wire on the core to move the core, means for intermittently moving the kicker member away from the nose and resilient means urging the kicker member toward the nose, the intermittently moving means being synchronized with the coil winding means so as to operate during a predetermined portion of the winding of each turn of a coil.

10. Coil winding apparatus for winding coils on cores, said apparatus comprising core holding means having a nose thereon, means for winding wire on a core adjacent said nose, a movable kicker member serving to engage a turn of wire on the core to move the core, means for positively moving the kicker member away from the nose, and for releasing the kicker member, and resilient means urging the kicker member toward the nose to engage the nose upon release by the positive moving means.

References Cited in the file of this patent

UNITED STATES PATENTS

| | | |
|---|---|---|
| 409,248 | Sieg et al. | Aug. 20, 1889 |
| 1,265,640 | Fisher | May 7, 1918 |
| 1,879,882 | Pullets | Sept. 27, 1932 |
| 1,912,287 | Lundell | May 30, 1933 |
| 2,433,112 | Goddard | Dec. 23, 1947 |
| 2,757,873 | Bugg | Aug. 7, 1956 |